UNITED STATES PATENT OFFICE.

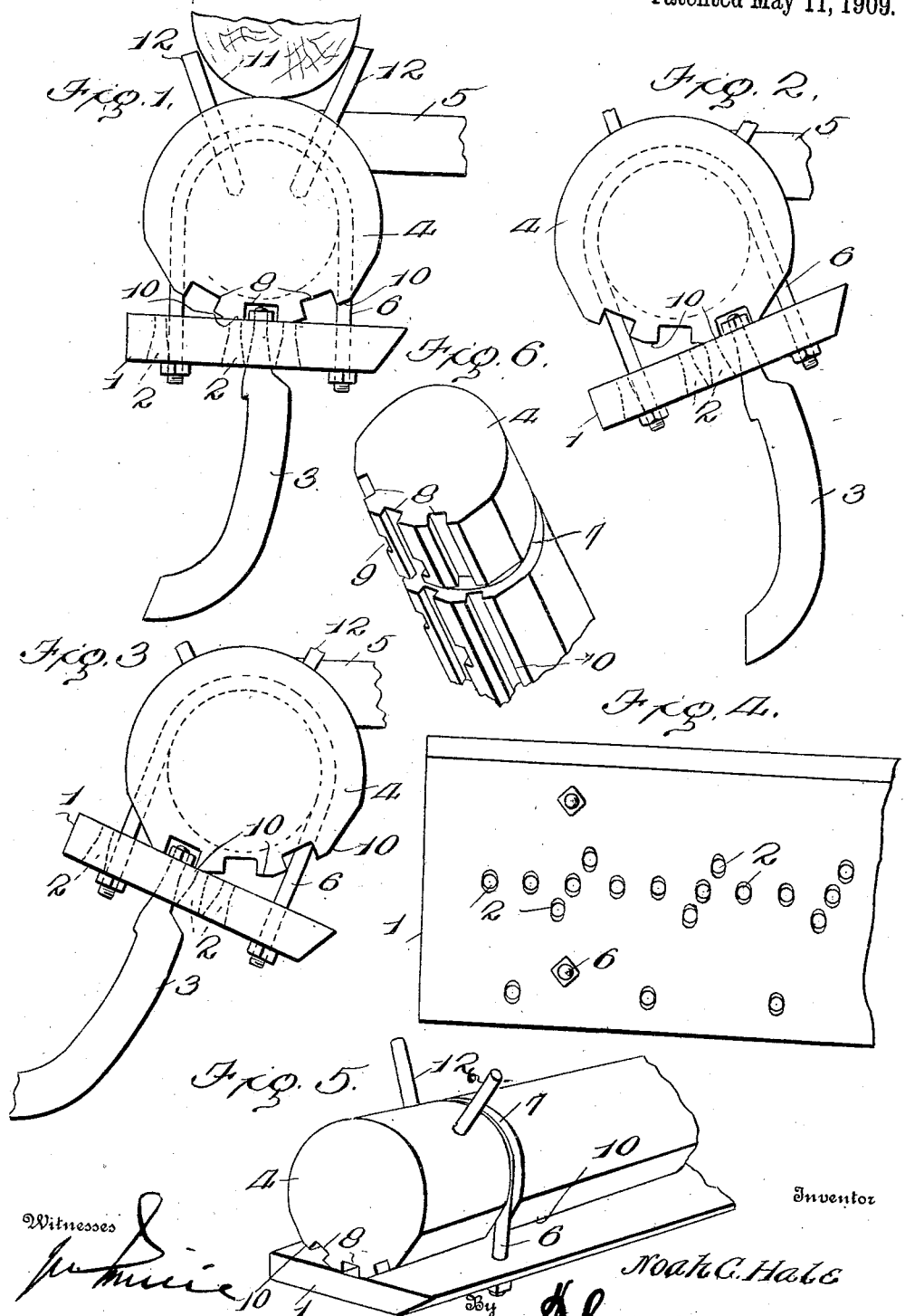

NOAH C. HALE, OF BOATWRIGHT, KENTUCKY, ASSIGNOR OF ONE-HALF TO J. B. HALE, OF BOATWRIGHT, KENTUCKY.

HARROW.

No. 921,608.      Specification of Letters Patent.      Patented May 11, 1909.

Application filed June 13, 1908. Serial No. 438,375.

*To all whom it may concern:*

Be it known that I, NOAH C. HALE, a citizen of the United States, residing at Boatwright, in the county of Calloway and State of Kentucky, have invented certain new and useful Improvements in Harrows, of which the following is a specification.

The purpose of the present invention is the provision of a novel form of implement for use in the fields for breaking clods, pulverizing the soil and otherwise preparing the same for reception of seed.

The invention is primarily designed to supply a harrow having teeth which may be readily adjusted to meet varying conditions of work and soil, said teeth being adjustable to occupy either a vertical position or to be inclined forwardly or rearwardly as may be required.

The implement embodies in its organization a plate or bar provided with teeth, a head to which the draft is applied, and means for adjusting and securing the plate or bar to the head and in the required position after the desired set has been given to the teeth.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is an end view of an implement embodying the invention, showing the teeth occupying an approximately vertical position. Fig. 2 is a view similar to Fig. 1, showing the plate or bar adjusted to incline the teeth forwardly at their lower ends. Fig. 3 is a view similar to Figs. 1 and 2, showing the plate or bar moved to throw the teeth at a rearward inclination at their lower ends. Fig. 4 is a view of an end portion of the plate or bar inverted. Fig. 5 is a detail perspective view of an end portion of the implement, the teeth being omitted. Fig. 6 is a perspective view of an end portion of the head.

Corresponding and like parts are referred to in the following description and indicated in all the views of the drawings by the same reference characters.

The implement comprises a plate or bar 1 which may be of any length and width and of any material best adapted for the purpose. A series of openings 2 are formed in the plate or bar 1 to receive the shanks of the harrow teeth 3, said openings being in rows and as many rows of openings being provided as desired to accommodate one or more rows of teeth, which latter may be set as closely together as desired or arranged in staggered position according to the result to be attained. The teeth 3 are thin and wide and their lower portions curve, the front edges of the teeth being sharpened so as to penetrate turf, roots and the like. The teeth 3 may be secured in the openings 2 in any convenient and substantial way, and, as shown, the upper ends of their shanks are threaded and receive nuts in the manner well understood. The front edge of the plate or bar 1 is beveled so as to ride over clods or any earth that may come in contact therewith.

The head 4 has a pole or tongue 5 connected thereto for receiving the draft by means of which the implement is drawn over the field. The head 4 consists preferably of a heavy timber and is of rounded form to admit of adjustment of the plate or bar 1 therearound, as indicated in the several views 1, 2 and 3. Clips 6 secure the plate or bar 1 to the head 4, the latter having a groove 7 for each clip, thereby preventing relative endwise movement of the parts 1 and 4. A series of grooves 8 are formed along the sides of the head 4 and are intended to receive the projecting ends of the shanks so that the plate or bar 1 may lie close against the head in any adjusted position. Notches 9 are formed in the head along a side of the grooves 8 to receive portions of the nuts, thereby preventing the latter from permitting the plate or bar 1 to ride close against the head. In order that the position of the plate or bar 1 may be fixed, the head 4 is formed with a series of faces 10, the latter forming seats against which the plate or bar 1 is clamped in the adjusted position. The seats or faces 10 may be of any width and extend lengthwise of the head, and the grooves 8 are formed therein.

It is to be understood that the pole or tongue 5 normally occupies an approximately horizontal position, hence the position of the head 4 is fixed. The plate or bar 1 provided with the teeth 3, is adjustable around the head 4, hence the position of the teeth 3 may be changed as required to meet varying conditions, as indicated in the several views 1, 2 and 3. When the clips 6 are loosened, the plate or bar 1 may be turned about the head and when moved to the required position is made secure by retightening the clips 6.

Usually the weight of the head 4, plate 1 and adjunctive parts, is sufficient to hold the teeth 3 in the ground, but should it be necessary to add additional weight to hold the teeth to their work, a beam 11 may be placed upon the head 4, said beam being retained in place by means of stakes 12 fitted into openings formed in the head 4.

Having thus described the invention, what is claimed as new is:

1. In combination, a relatively fixed head of approximately rounded form and having a series of flat faces, a plate provided with teeth and adjustable about the head to obtain a bearing against any one of the said flat faces, and means for securing the plate to the head in the adjusted position.

2. In an implement of the character described, the combination of a relatively fixed head of approximately rounded form and provided with a series of longitudinal grooves, a plate provided with teeth whose shanks project above the plate, the plate being adjustable about said head and the projecting ends of the shanks adapted to enter one of said longitudinal grooves formed therein, and means for securing the plate to the head in the adjusted position.

3. In combination, a rounded head having a pole, a plate provided with teeth and adjustable around said head to vary the inclination of the teeth, and clip fastenings for securing the plate to the head in the required adjusted position.

4. The herein described implement, comprising a rounded head having a draft attachment connected therewith and having a series of flat faces, longitudinal grooves in said faces, a plate having a plurality of openings, teeth secured in selected openings of the series formed in said plate, and clips for securing the plate to the head in the adjusted position.

In testimony whereof I affix my signature in presence of two witnesses.

NOAH C. HALE. [L. S.]

Witnesses:
V. B. HILLYARD,
W. N. WOODSON.